Jan. 20, 1931.                D. DYRESEN                1,789,355
                           SEPARABLE FASTENER
                          Filed March 6, 1926
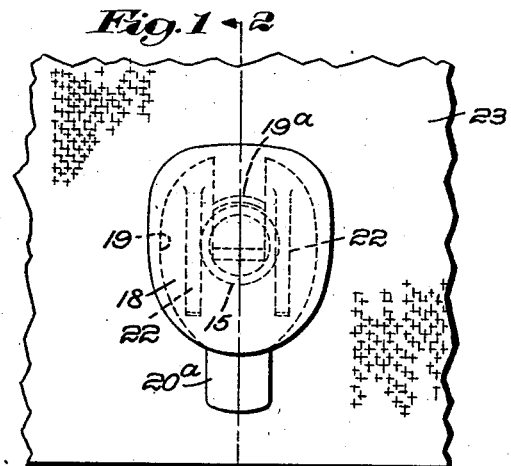
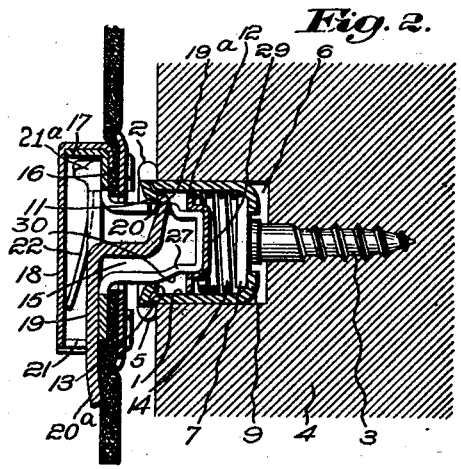
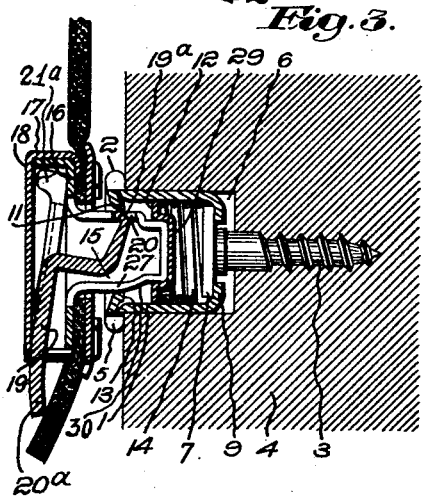
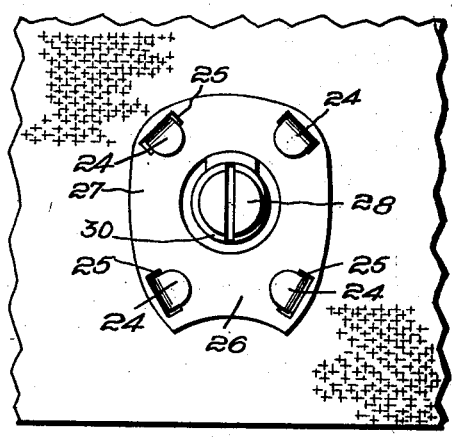
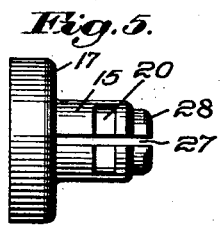
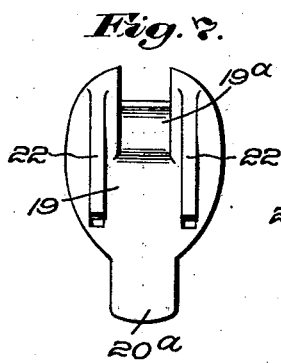
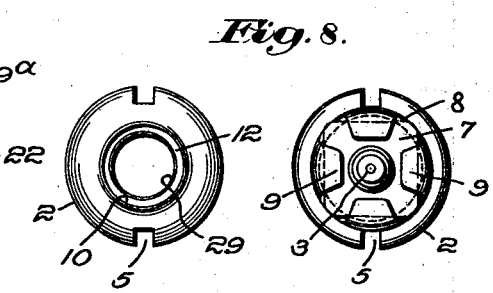
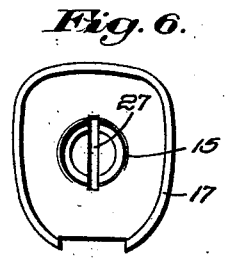
Inventor:
Didrick Dyresen, Patented Jan. 20, 1931

1,789,355

UNITED STATES PATENT OFFICE

DIDRICK DYRESEN, OF MALDEN, MASSACHUSETTS

SEPARABLE FASTENER

Application filed March 6, 1926. Serial No. 92,718.

This invention aims to provide improvements in separable fasteners.

In the drawings, which illustrate a preferred embodiment of my invention:—

Figure 1 is a front elevation of the fastener;

Fig. 2 is a section on the line 2—2 of Fig. 1, being partly in elevation;

Fig. 3 is a section similar to Fig. 2, but showing the stud unlocked prior to disengagement from the socket;

Fig. 4 is a rear elevation of the stud attached to a curtain;

Fig. 5 is a plan view of the socket-engaging part of the stud prior to assembly;

Fig. 6 is an elevation view of the part shown in Fig. 5;

Fig. 7 is an elevation view of the latch presenting member of the stud; and

Fig. 8 includes a front and rear elevation of the socket.

Referring to the drawings, I have shown a three-side lock fastener including a flush type socket secured to a rigid support and a stud secured to a flexible support. The supports may be the body and curtain of a motor vehicle or the like.

The socket may be of any suitable construction which provides a stud-receiving aperture and a space behind the aperture. However, I have shown a socket including a casing 1 having a flange 2 at one end and a screw 3 assembled with the opposite end. The casing may be secured to a rigid support 4 by inserting a suitable tool in slots 5 provided in the flange and turning the casing so that the screw 3 may be threaded into the support 4 until the flange 2 rests against the outer face of the support 4. The body portion of the casing fits into the recess 6 counterbored into the support 4, as shown in Figs. 2 and 3. The head 7 of the screw 3 seats against edge seats 8 (Fig. 3) provided at the inner end of the casing, and is held against turning relative to the casing by prongs 9 bent over and against the head 7 as illustrated. In the flanged end of the casing is provided a stud-receiving aperture 10 surrounded by a wall 11 and normally closed by a closure plate 12 held against a shoulder 13 provided at the inner end of the wall 11 by a spring 14.

The stud includes a hollow pressed metal socket-engaging part 15 having a base 16 with a wall 17 of substantial width at the outer periphery of the base. A front plate 18 is secured against the outer edge of the wall 17 to provide a casing. In this casing is assembled a one-piece latch presenting part or lever element having a base 19 generally conforming with the outline of the wall 17 and presenting at one end a latch portion 19a extending into the hollow socket-engaging part 15 and then out through a slot 20 at the upper side of the part 15. The latch presenting part also has at the other end a finger 20a which passes out of the casing of the stud through a slot 21 at the lower edge of the casing, as shown in Figs. 1, 2 and 3. Spring portions 22 are pressed from the base 19 and press against the front plate 18 normally to hold the base 19 against the base 16 of the socket-engaging part, as shown in Fig. 2. Boss portions 21a are provided at the upper end of the base to provide a pivot for the latch presenting member.

While the stud may be secured to the curtain 23 in any suitable manner, I prefer to secure it thereto with the casing portion and finger 20 located at the front face of the curtain 23. To this end, I provide the front plate with prongs 24 which pass through the material of the curtain and then through slots 25 in a back plate 26 against which they are bent, thereby providing a simple yet durable attachment.

The socket-engaging part is divided by a slot 27 terminating in the base 16 to permit contraction of the part 15 as it passes into the aperture, thereby gripping the wall 11 surrounding the aperture. As the socket-engaging part 15 passes into the stud-receiving aperture 10, the protruding portion of the latch 19a is pressed into the part 15 by the wall 11 and then snaps out again to lodge behind the shoulder 5. The latch portion is of substantial width and its free end is curved and provided with a flat portion (Fig. 7) for providing a substantial bearing surface against the shoulder effectively to lock the stud against separation from the socket when outward strain is exerted on the curtain at the sides and above the stud. The flat bearing surface is provided by undercutting the latch adjacent its end, as shown in Figs. 2, 3 and 7.

The finger 20a is curved slightly toward the curtain 23 and the lower portion of the attaching plate 26 is cut away to permit the finger to be pressed tightly against the curtain as shown in Fig. 2.

The socket-engaging part 15 is provided at its outer end with a reduced cylindrical portion 28 which enters a recess 29 provided in the closure plate 12 when the stud is engaged with the socket as shown in Fig. 2. This interengagement between the end of the stud and the closure plate assists in preventing separation of the fastener when lateral strain is exerted upon the curtain. However, it is to be understood that this interlocking engagement is not absolutely essential and may be dispensed with especially when the stud is used with a socket having no follower in its casing. Where a follower is used, it aids the effective locking of the stud and socket.

Separation of the fastener is preferably effected by grasping the lower edge of the curtain 23 and exerting an outward pull thereon, as shown in Fig. 3. This action causes the curtain to move the depending finger 20a toward the front plate 18 thereby tipping the latch presenting part about the pivot provided between the upper end of this part and the casing as shown in Fig. 3. As the finger moves toward the front plate, the latch 19a is withdrawn from engagement with the shoulder 13 into the hollow socket-engaging part 15, thereby releasing the lock between the stud and socket. So far there has been no relative tipping between the stud as a whole and the socket. Immediately after the latch is released from the shoulder 13, the spring 14, which has been previously compressed by entrance of the stud into the socket, presses the follower 12 and the stud outwardly. This action, combined with a continued pull on the curtain, tips the stud out of engagement with the socket. Tipping action is readily effected, because the lower portion 30 of the socket-engaging part 15 slopes gradually downwardly from the reduced portion 28 to a point where the socket-engaging part engages the wall 11 when engaged with the socket.

From the foregoing description it will be understood that I have provided a simple, inexpensive three-side lock fastener, so called because it is locked against separation by strain except an outward strain exerted at a predetermined side thereof.

While I have shown and described a preferred embodiment of my invention, it will be understood that changes involving omission, substitution, alteration and reversal of parts, and even changes in the mode of operation may be made without departing from the scope of my invention, which is best defined in the appended claims.

I claim:

1. A separable fastener including a socket element and a stud element, one of said elements secured to a flexible support, a lever pivoted to the fastener element secured to the flexible support, said lever presenting one end thereof through a slot at one side of said fastener element for locking the fastener elements together and said lever having its other end extending substantially parallel to the flexible support whereby said lever may be operated by initial movement of the flexible support relative to the fastener element secured thereto thereby to withdraw the locking end of said lever from locking position and separate the stud and socket.

2. A separable fastener comprising, in combination, a socket presenting a stud-receiving aperture, a cooperating stud presenting a substantially cylindrical contractible and expansible portion for passage through said aperture and for yieldable engagement with a wall surrounding said aperture, a locking portion projecting through a slot at one side of said contractible and expansible portion for locking the stud to the socket, attaching means for securing the stud to a flexible support, and means associated with the locking portion and extending substantially parallel to the flexible support whereby it may be operated by initial movement of the flexible support relative to said stud thereby to shift said locking portion out of locking engagement with the socket and separate the stud from the socket.

3. A separable fastener comprising, in combination, a socket having a stud-receiving aperture surrounded by a wall, a shoulder back of said wall and means for securing the socket to a support, a cooperating stud having a shank portion for entrance into the aperture in said socket, a lever pivoted to the stud and having a latch portion projecting through a slot at one side of said shank portion for engagement behind said shoulder to lock the stud and socket together, attaching means for securing the stud to a flexible support and means formed integral with said latch and extending substantially parallel to the flexible support whereby it may be operated by initial movement of said flexible support relative to the stud attaching means thereby to release said latch portion from behind said shoulder, and a continued pull on the flexible support separating the stud from the socket.

4. A three-side lock fastener comprising, in combination, a socket presenting a stud-receiving aperture, a stud secured to a flexible support and presenting a portion for passage into the aperture of said socket, a lever pivoted upon said stud and presenting a latch portion through a slot at one side of the portion for engagement with said socket to lock the stud against separation by strain at three sides thereof, and said lever presenting a finger at the outer face of the flexible support to be acted upon in such a way by initial pull upon the lower edge of the flexible support that the lever is tipped relative to the stud thereby withdrawing the latch portion within the socket-engaging portion to permit tipping of said stud out of engagement with the socket.

5. A three-side lock flush type fastener comprising, in combination, a stud member and a socket member secured to separate supports, a socket-engaging portion presented by the stud member for passage into said socket member, locking means extending through a slot at one side of said socket-engaging portion for engagement with a shoulder presented by said socket member thereby to lock the stud member against separation by outward stress exerted at three sides of the fastener and means associated with the locking means for permitting separation of the fastener by a pull at the fourth side and a spring-pressed member in the socket member having a portion pressed therefrom and making engagement with the free end of the socket-engaging portion to assist in preventing separation of the fastener by stress exerted transverse to the axis of the socket member.

6. A three-side lock flush type fastener comprising, in combination, a stud member and a socket member secured to separate supports, a shank portion presented by the stud member for passage into said socket member, a single resiliently pressed latch extending outwardly through a slot at one side of said shank portion to lock the stud member against separation by outward stress exerted at three sides and means associated with the resiliently pressed latch for permitting separation by a pull at the fourth side and a spring-pressed member in the socket member having a portion pressed therefrom, said portion making parallel engagement with the stud member to assist in preventing separation of the fastener by stress exerted transverse to the axis of the socket member, said spring-pressed member being moved inwardly when the stud and socket are engaged thereby assisting separation of the stud member and socket member by pressing outwardly upon the shank portion when a separating pull is exerted at the fourth side.

7. A three-side lock flush type fastener comprising, in combination, a stud member and a socket member secured to separate supports, means presented by the stud for locking the stud against separation by outward strain exerted at three sides while permitting separation by a pull at the fourth side, a reduced end portion presented by the stud within said socket when engaged therewith and a spring-pressed follower in said socket having a recess into which the reduced end portion fits to assist in preventing separation of the fastener when the parts are subject to lateral strain.

8. A separable fastener stud comprising, as a unit before assembly to a support, a socket-engaging part having a base, a front plate secured in spaced relation to said base to provide a casing, a part located in said casing between said base and said front plate, said part being pivoted adjacent to the outer periphery of the casing, said part having a locking portion for fastening the stud to a socket and said part also having a movable finger extending laterally from said casing between the base and the front plate and co-acting to permit operation of said pivoted part.

9. A separable fastener stud including a socket-engaging part having a base, a front plate secured in spaced relation to said base to provide a casing, a part between said base and said front plate pivoted to said casing and presenting integral spring-portions normally pressing said part against said base, a locking latch extending through a slot in one side of the socket-engaging part and a finger associated with said locking latch extending from between the front plate and base to be operated against the pressure of said spring portions to draw said latch portion within said socket-engaging part.

10. A separable fastener stud including a hollow contractible and expansible socket-engaging part having a base, a front plate secured in spaced relation to said base to provide a casing, a part between said base and said front plate pivoted in said casing and presenting integral spring portions normally pressing said part against said base, a locking latch extending through a slot in one side of the socket-engaging part and a finger associated with said locking latch extending from between the front plate and base to be operated against the pressure of said spring portions to draw said latch portion within said socket-engaging part.

11. A separable fastener stud including a socket-engaging part having a base, a front plate secured in spaced relation to said base to provide a casing, a part between said base and said front plate pivoted adjacent to the outer periphery of the casing, a movable finger extending laterally from said casing between the base and the front plate, and a second latch portion associated with said movable finger and extending through a slot at one side of said socket-engaging part and presenting a relatively wide flat socket-engaging surface at its free end, said latch portion being operable by movement of said finger, said latch portion and said finger being integral with said pivoted part.

12. A separable fastener including a socket element and a stud element, one of said elements secured to a flexible support, resiliently supported means pivoted in the fastener element secured to the flexible support and presenting a latch portion for engagement with the cooperating fastener element and said resiliently supported means also presenting a depending finger adjacent to and cooperating with the flexible support for operation by initial movement of the flexible support relative to the fastener element secured thereto, thereby to withdraw said latch from engagement with said other fastener element to permit separation of the fastener elements.

In testimony whereof, I have signed my name to this specification.

DIDRICK DYRESEN.